Oct. 25, 1966 W. STUDER 3,281,634

METHOD AND DEVICE FOR INFLUENCING TAPE TRACTION IN TRANSPORT APPARATUS FOR TAPE-TYPE RECORD CARRIERS

Filed Dec. 15, 1961

INVENTOR.
Willi Studer

BY Werner W. Kleeman

ATTORNEY

United States Patent Office 3,281,634
Patented Oct. 25, 1966

3,281,634

METHOD AND DEVICE FOR INFLUENCING TAPE TRACTION IN TRANSPORT APPARATUS FOR TAPE-TYPE RECORD CARRIERS

Willi Studer, Althardstrasse 150, Regensdorf, Zurich, Switzerland

Filed Dec. 15, 1961, Ser. No. 159,660
Claims priority, application Switzerland, Dec. 20, 1960, 14,410/60
12 Claims. (Cl. 318—314)

The present invention broadly relates to an improved method of and means for controlling the movement of a band, tape or the like, more specifically, the tape traction or tensional stress exerted on the tape as such travels between a wind-up spool and a supply or delivery spool, especially for tape recorders so as to ensure for a high quality of playback in the reproduction of sound or otherwise.

In the sound reproducing art tape-type record carriers are known and particularly used in the form of magnetizable tapes for recording information of various kinds. As such, very exacting demands are generally made upon the uniformity of the speed of movement of the tape. The requirement for uniformity of speed of the tape movement is of particular importance in the application of magnetic recording of sound. As a rule, in such devices the tape movement is influenced by insertion between a shaft end or capstan which rotates at a highly uniform rate and a pressure roller. The high precision design of the bearings, appropriate mechanical filters, synchronous motors rotating most uniformly and so forth, ensure for the most constant possible tape speed.

The effective tape speed and uniformity obtained in a tape recorder mechanism for reproduction and playback is, however, in actual practice influenced by a number of other factors. Since the recording and scanning stations are generally always arranged between the driving spool and the tape supply, the uniformity of unwinding commonly plays an exceptionally important role since the elasticity of the tape and the geometric arrangement of its path of movement will cause undesirable changes in tape traction, even though the tape and the conveying or transport mechanism may be very rigidly coupled. It is known that such drawbacks may to a certain extent be eliminated by mechanical filters arranged in front of the wind-off or feed spool, suitable brakes provided at the unwinding station, designing the winding motor with the most uniform possible moment of rotation, also with variable rotational speeds and so forth.

These aforementioned measures for obtaining uniform tape traction free of temporary variations of longer or shorter duration will not suffice where demands are exacting, and it is for this reason that various other solutions have been attempted wherein the tape traction on itself was used to control the unwinding motor. In heretofore known tape traction controls, the tension of the tape is mechanically sensed by a feeler and translated in some form, generally electrically, into an operative action upon the unwinding motor. Further, generally all apparatus for magnetic sound recording is provided with at least two different tape speeds for practical operation. For example, not only for standard recording or reproducing speeds, but also for substantially increased rewinding speeds for carrying out rapid forward or return winding. Since on the other hand the uniformity of the tape roll produced on the spools will also affect the consistency of the overall tape movement, the uniformity of the unwinding traction must also be ensured at these higher speeds of the record carrier.

In practice, all these factors are additionally influenced by the fact that the starting and stopping times of the displaced tape and all elements moved along with it must be kept as short as possible. Practice requires selective control or influence of the entire unwinding system in order to enable adjustment to be made to the varying operating conditions. This is true not only because of the possibility of running the tape at different speeds but, where tape speed is constant, because of the diameter of the roll of tape varying from the beginning to the end of the tape length, and the thus resulting variable rotational speed. This possibility of adjustment to the operating characteristic of the apparatus, that is to say, adjustment to the different requirements of tape traction at the beginning and at the end of a spool roll, and during slow and rapid tape travel, appears to be only possible by elimination of mechanical sensing means and by application of electrical controls.

Accordingly, it is a primary object of the present invention to provide an improved method and electrical circuit arrangement for influencing tape traction in tape displacing apparatus for tape type record carriers.

Another important object of the present invention is to provide improved method and means for controlling the tensional stress exerted on a tape or the like in a tape recorder or like apparatus to ensure high quality reproduction.

A further important object of the present invention is to provide improved electrical means for influencing tape traction irrespective of the amount of tape present on its associated supply spool.

Another object of the present invention is to provide improved means for controlling tape traction in dependence upon the rotational speed of a shaft member carrying the tape to be unwound.

Still a further important object of the present invention is to provide improved mechanism for generating signals which are a function of the changes of speed of movement of a shaft member rotated by a tape or band member moving between a wind-off and wind-on spool, and employing such signals as an adjustment factor to regulate a braking element operable upon the shaft member carrying the wind-off spool.

Yet a further important object of the present invention is to provide improved method and means for generating electrical signals which are indicative of the tape traction or tensional stress exerted at a tape member, and utilizing such signals to control a supply circuit for a suitable brake unit to control such tape movement traction.

The method of the present invention for influencing tape traction enable very accurate adjustment for all operational requirements to be obtained by virture of the purely electrical solution of the problem. Generally speaking, it is characterized in that an adjustment factor depending upon the varying rotational speed of the shaft carrying the unwinding tape is employed, which after suitable amplification, is used to influence the braking action of an operable member, such as for example an electric motor. Since the electric adjustment factor can, if desired, be influenced during amplification also nonlinearly, all requirements encountered can readily be satisfied and the reaction or response for the controlling operation is virtually inertialess, a fact highly desirable in view of the importance of avoiding momentary influences which are particularly disturbing. The rotational speed of the shaft carrying the wind-off spool is a direct measure for the tape speed and, more particularly, in the case of variations in the rotational speed, for deviations from the required value of the tape traction or tensional stress exerted on the tape. Additionally, an important advantage for practical operation is obtained insofar as change-over to different operating conditions, for example, when the tape speed is altered, can be achieved by a simple electrical switching action. The consistancy and reliability of operation is, however, achieved mainly by avoiding a detour or change of the path of movement of the tape normally exerted by a mechanical sensing element or feeler, which cannot possibly permit for uniform operation at different tape speeds, and which is as a rule completely ineffective at high rewinding speeds.

A simple possibility for obtaining such adjustment factor is achieved with the inventive process by employing an operable braking member such as a unwinding motor which is provided with a device which produces a frequency or electrical signals proportional to the rotational speed of the rotating shaft and serves as an electrical adjustment factor. The generated frequency or electrical signals which are a function of the rotational speed of said shaft may be obtained in a number of different ways. By way of example, and not limitation, a photoelectrical device known per se to the art has been found to be suitable. Such device is constructed and arranged in such a manner that the shaft of the unwinding spool unit carries an apertured rotatable disk which is located in the path of a light beam and influences a light-sensitive control member during its rotation. Moreover, the high performance of modern semi-conductor elements, such as photo-transistors, resistor elements and others familiar to the art enable such an arrangement to be designed simply and at relatively low cost. Furthermore, the speed-responsive adjustment factor may be obtained by a device producing a current surge or impulses by magnetically influencing the field of at least one coil. Thus, a further characteristic feature of the invention is that the unwinding arrangement is provided with a permanently magnetized unit which rotates therewith and influences the coil windings. The adjustment factor can then be obtained in the form of voltage pulses from the stationary coils.

The adjustment factor which is obtained in a suitable manner and in the form of an electrical voltage of variable frequency is amplified via an amplifier and fed to a load or supply circuit to control the motor for exerting the desired braking action. Generally, the adjustment factor of variable frequency is employed to obtain a linear or non-linear voltage which is then supplied to such motor so as to adjust the moment of rotation or counter torque opposing the actual direction of rotation during tape unwinding. The necessary relationship of this voltage with the imposed frequency is obtained by regulating the amplifier and accordingly, a further characteristic of the invention is that the amplifier is provided with frequency responsive control elements. This measure enables the course of the moment of counter-rotation of the unwinding motor to be designed to rise or fall, or to remain constant with the speed of revolution depending upon requirements. In particular, it is also possible, by means of the amplitude or frequency characteristics of the amplifier to effect adjustment to different tape speed ranges if such are employed. For the very substantial speed changes observed in changeover to rapid rewinding or unwinding, it will generally be necessary to appropriately shift the entire range of adjustment or control, since the frequencies then operative as adjustment factors are larger by about one magnitude. The apparatus and method of the present invention is therefore further characterized by the feature of switching of the electrical components of the amplifier for accommodation to the various operating conditions of the moving apparatus for tape-type record carriers.

Hence, in a preferred manifestation of the present invention there is provided an arrangement including a shaft member adapted to be rotated by the tape being unwound for permitting advancing the tape or band member. An operable element designed to exert a braking effect or counter torque upon the rotatable shaft is associated therewith and may, for example, be an electric motor adapted for winding or unwinding of the tape as the case may be. Of course, other forms of braking units are contemplated, such as magnetic clutches or brakes, eddy current brakes and so forth, as will readily suggest itself to those familiar with the art. Suitable means are carried by the rotatable shaft for purposes of generating electrical signals in an operating circuit in accordance with varying rotational speed of said shaft. Such means may be, for example, an apertured disk cooperating with a light sensitive control member or photo transducer, or else, a magnetic disk adapted to induce electrical impulses in a pick-up coil of a core member. The electrical impulses appearing in the operating circuit are preferably amplified and rectified and employed to control the impedance of an inductor in a supply circuit for the electric motor. In this manner, the current fed to the electric motor and the braking effect exerted thereby is directly effected and controlled by the electrical adjustment factor which is a function of the tape movement.

The method of the present invention, generally speaking, contemplates generating electrical signals or impulses which are a function of the varying rotational speed of a shaft carrying the tape, amplifying such electrical signals or impulses, and employing the thus amplified signals as an adjustment factor to control the braking effect of an operable member associated with said shaft.

Further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figures 1, 2, 3, 4:
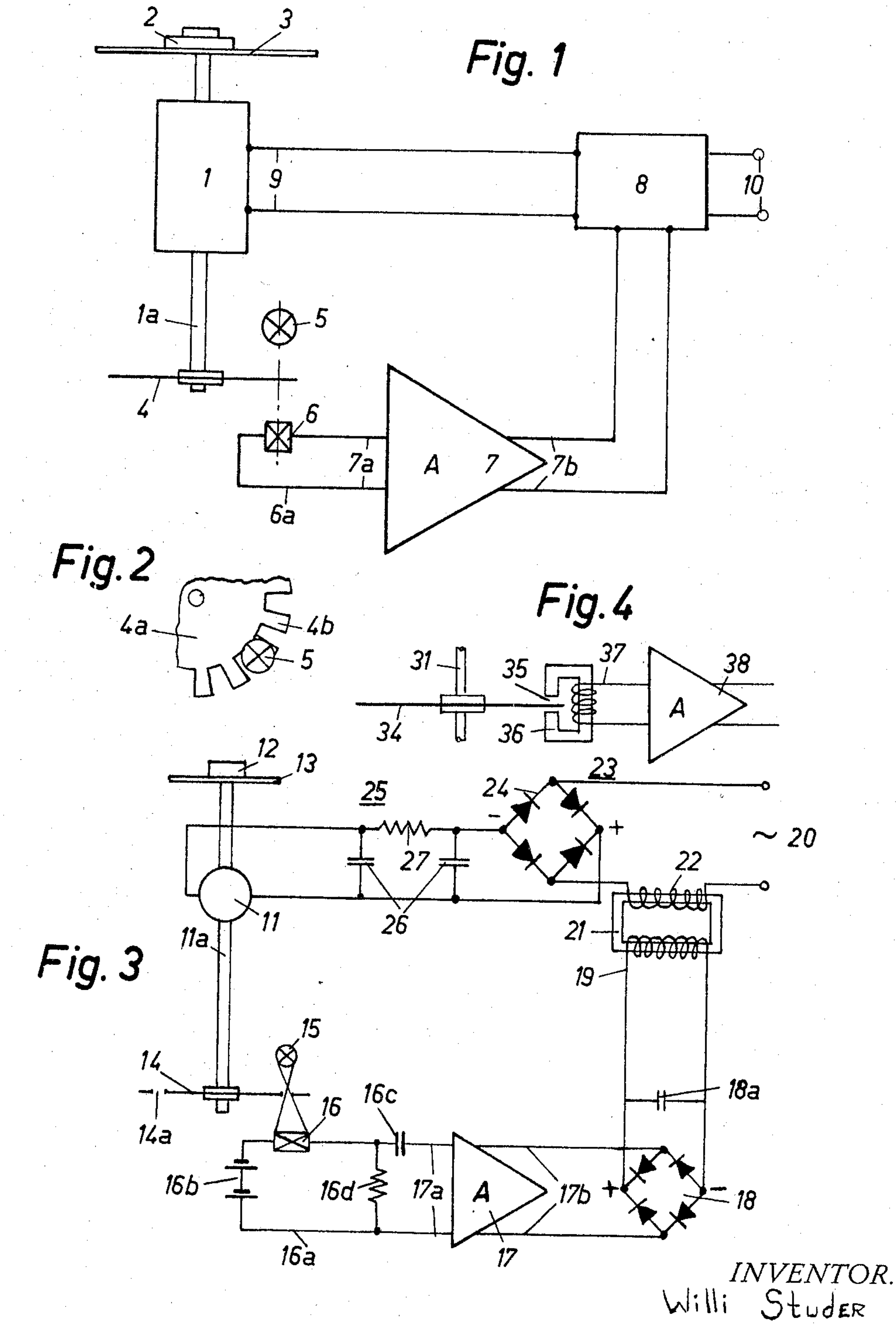
FIGURE 1 is a schematic circuit diagram of one form of arrangement of a device designed according to the present invention.
FIGURE 2 is a fragmentary view of one form of disk member adapted to be employed with photosensitive means.
FIGURE 3 is a circuit diagram showing in detail the arrangement of components of the device of FIGURE 1.
FIGURE 4 is a modification of the arrangement of FIGURES 1 to 3 employing a magnetic disk and pick-up coil for generating electrical signals or impulses.

Referring now to the drawings and, more particularly, to the schematic circuit diagram of FIGURE 1, there is shown one form or arrangement for controlling or influencing tape traction in apparatus for tape-type record carriers or otherwise. For purposes of clarity in illustration, only enough of the tape recorder structure has been shown which will enable one to have a clear understanding of the teachings of the present invention. To this end, there is provided a shaft member 1*a* adapted to be rotated by the tape being unwound in a known manner to permit unwinding of a roll of tape or band located on a conventional flanged wind-off spool (not shown), which spool is adapted to be carried by a support plate 3 and centering core 2 disposed at the upper end of the rotatable shaft member 1*a*. An operable member 1 adapted to exert a braking effect advantageously in the form of a counter torque on the rotatable shaft 1*a* is associated therewith. The operable braking member may be an electric motor adapted to function as a winding or unwinding motor, or some other suitable form of braking unit, such as a magnetic clutch or brake for example. In the region of the lower end of the shaft member 1*a* there is mounted for rotation therewith an apertured disk 4 provided with a suitable number of teeth, bores or suitable light-passing openings. Thus, for example, in the arrangement of FIGURE 2 there is shown a plate member 4a provided with teeth 4b spaced about its circumference and intermittently passes light rays from an exciter lamp 5a, whereas in FIGURE 3 there is shown a plate member 14 having bores 14a about its circumference for passing light rays from an associated exciter lamp 15.

It will thus be apparent that during rotation of the shaft member 1a light can periodically pass from the exciter lamp 5 onto a light-sensitive control member or photo transducer 6 arranged in an operating circuit generally designated by reference numeral 6a. Suitable photo transducers useful in this arrangement, by way of example, a photoelectric cell, photo diode, photo transistor, phototube, photo resistor or other light-sensitive control elements are known to the art. The generated electric signals or impulses, which are proportional to the rotational speed of the shaft 1a and hence indicative of the speed of movement of the tape, and more specifically to the tape traction or tensional stress exerted on the tape, are supplied to the input terminals 7a of an amplifier 7 located in operating circuit 6a. The electrical signal or voltage appearing at the output terminals 7b of the amplifier 7 is employed to influence the rotational speed or braking effect of the motor 1.

Such control of the motor 1 may be carried out in a number of possible ways. Thus, by way of example, the thus amplified speed adjustment factor may be employed, in the form of a pulsating direct current, to premagnetize a saturation impedance which correspondingly controls a supply voltage 10 supplied to the input terminals 9 of the motor 1. A control device 8 is provided which is designed to control the supply voltage 10 and may not only include a saturation impedance, magnetic amplifier or other magnetic means, but also rectifiers and other control members necessary for the conventional operation of the motor for rapid unwinding or rewinding as the situation requires, the details of which will become apparent from the description to follow. Furthermore, in practice, the change-over from low to high speed tape movement generally involves a change of the frequency responsive control members of the amplifier 7 and other associated circuit components. These details, which are not directly involved in tape traction control, are not here shown since they are incorporated with other circuit members most commonly designed as push-button controls present in tape recorders and which do not differ from conventional arrangements.

As already previously mentioned, the rotational speed of the motor or, more specifically, its counter-rotational moment or counter torque may be influenced in various ways. For example, the motor units may be designed as D.C. motors having a relatively low operating voltage, for reasons not primarily directly connected with the possibility of tape traction control. In such an instance, the amplifier control unit 7 is provided with a power transistor which suitably controls the current supplied by a rectifier which is fed to the motor 1 for adjustment of the braking action, as will be more specifically explained with the discussion of FIGURE 3 shortly to follow. Obviously, and as will suggest itself to persons skilled in the art, other means may be employed in the arrangement of the present invention which are generally elsewhere employed for controlling the rotational speed of motors, such as for example auxiliary windings in the motor stator which are additionally passed by the control currents, and so forth.

In FIGURE 3 there is illustrated the details of the schematic arrangement of the device shown in FIGURE 1. In a like manner, there is here shown a rotatable shaft 11a as well as a plate or disk 14 provided with apertures or bores 14a. The disk 14 passes light rays from lamp 15 to a photo transducer such as a photo resistor 16 for example, arranged in operating circuit 16a and supplied by battery 16b for example. Arranged in the operating circuit 16a is an amplifier 17, the input terminals 17a of which are electrically coupled with a capacitor 16c and input resistor 16d, whereas at the output terminals 17b of the amplifier 17 there is arranged a full wave rectifier arrangement 18. The generated electric signals or impulses are amplified in the amplifier 17 and then rectified and may be smoothed by capacitor 18a. The rectified current is then fed to a coil 19 of a core 21, to thereby control the impedance of an inductor 22 appearing in supply circuit 23. In this manner the current fed through the supply circuit from the alternating power source 20 to the motor 11 can be adjustably controlled in a manner as previously described. Associated with the supply circuit 23 is a full wave rectifier 24 and filter arrangement 25, the latter of which is composed of capacitors 26 and resistor means 27 in a known manner.

The aforedescribed principles may also be applied to any other method and arrangement for obtaining electrical signals or impulses serving as an adjustment factor which is a function of the rotational speed of the shaft member. Thus, in a similar operational manner, there is shown in FIGURE 4 a magnetic arrangement which may be employed in lieu of the photoelectric or photo transducer arrangement previously described. In such a case, the motor shaft 31 will then carry, instead of an apertured disk, a hard magnetic ferrite disk 34 for example, and on which an adequate number of magnetic poles have been magnetized. The permanent magnetic plate or disk 34 may be constructed to be alternately magnetized about its periphery. The disk member 34 is arranged to pass through an air gap 35 of a core 36 about which a pick-up coil 37 is arranged. The alternating current impulses generated in pick-up coil 37 are fed to an amplifier 38 and then to a circuit arrangement similar to that previously described with reference to FIGURE 3, so that a further description thereof is not believed necessary.

Of course, arrangements may also be employed which operate in a manner similar to that of a tachometer dynamo so as to supply an electrical voltage varying with the rotational speed, and which upon amplification serves to control the motor braking action and the tape traction. Again, the same effect may be obtained by means of a device in which the amplified control voltage is not operative directly on the motor but indirectly influences the moment of counter-rotation in the unwinding process by appropriately controlling a magnetic clutch or a magnetic brake, for example, in the manner of an eddy-current brake.

The general mode of operation of the entire arrangement in actual practice is determined by the following requirements: When a roll of tape or the like is unwound, it at first possesses a large diameter and, accordingly, a lower rotational speed which continuously increases at constant tape speed as the diameter of the tape roll decreases. In order to obtain constant tape traction, the moment of counter-rotation of the motor must be reduced as the diameter of the roll decreases and the rotational speed increases, with the control frequency correspondingly increasing. As the dynamic behavior of the entire tape transport system is involved in the practical requirements made, it may be desirable to combine this relationship or dependence, which is at first theoretically linear, with non-linearities in different ways. It need not be explained in greater detail that such functions can be obtained by means of simple RC members in a known manner so as to influence the frequency curve in the course of amplification. The rapid change in the frequency of the adjustment factor occurring in starting and stopping which corresponds to the beginning and end of the motor shaft rotation, may be employed to control certain processes in the starting or stopping phase. It is of course to be appreciated that various changes and modifications can be made without departing from the spirit and scope of the invention, as will readily suggest itself from the description appearing herein. Naturally, each rotatable shaft member of the tape recorder apparatus or otherwise may be provided with such a tape traction control.

Having thus described the nature of the present invention what is desired to be secured by United States Letters Patent, is:

1. In a method of influencing tape traction in conveying apparatus for tape type record carriers, preferably for magnetic recording tapes, the steps of: displacing a tape carried upon a rotatable shaft along a predetermined path, generating electrical signals which are a function of the varying rotational speed of the shaft carrying and rotated by the tape which is being unwound, amplifying said electrical signals, rectifying said amplified signals, and employing said rectified electrical signals as an adjustment factor for a supply circuit to control the voltage supplied to an electric motor associated with said shaft, whereby the counter torque of said electric motor upon said shaft is regulated.

2. In a method of influencing tape traction in conveying apparatus for tape type record carriers according to claim 1; wherein said rectified electrical signals are employed to saturate a core to control the magnitude of said supplied voltage.

3. In a method of influencing tape traction in conveying apparatus for tape type record carriers according to claim 2; including the step of rectifying said supplied voltage prior to being fed to said electric motor.

4. In a device of the type described for influencing tape traction in conveying apparatus for tape type record carriers, preferably for magnetic tapes, a shaft member mounted to be rotated by a tape being unwound, an electric motor providing a winding motor for tape for exerting a counter torque upon said shaft member, an operating circuit, means for generating electrical signals in said operating circuit in accordance with varying rotational speed of said shaft member, a supply circuit for said electric motor, said electrical signals generated in said operating circut serving as an adjustment factor for regulating said supply circuit to control the counter torque exerted by said electric motor upon said shaft member, said generating means including a light sensitive control member.

5. In a device of the type described for influencing tape traction in conveying apparatus for tape type record carriers, preferably for magnetic tapes, a shaft member mounted to be rotated by a tape being unwound, an electric motor providing a winding motor for tape for exerting a counter torque upon said shaft member, an operating circuit, means for generating electrical signals in said operating circuit in accordance with varying rotational speeds of said shaft member, a supply circuit for said electric motor, said electric signals generated in said operating circuit serving as an adjustment factor for regulating said supply circuit to control the counter torque exerted by said electric motor upon said shaft member, said generating means including a permanent magnetic disk alternately magnetized at its periphery which is carried by said shaft member, a core member in said operating circuit provided with an air gap into which said permanent magnetic disk extends and a pick-up coil associated with said core member for said electrical signals.

6. In a device of the type described according to claim 4; said light sensitive control member being photo transducer means.

7. In a device of the type described according to claim 6; said generating means further including a light source associated with said photo transducer means, and a plate member carried by said shaft member for regulating passage of light from said light source to said photo transducer means.

8. In a device of the type described according to claim 7; wherein said plate member is provided with apertures.

9. In a device of the type described according to claim 7; wherein said plate member is provided with teeth.

10. In a device of the type described for influencing tape traction in conveying apparatus for tape type record carriers, preferably for magnetic tapes, a shaft member mounted to be rotated by a tape being unwound, an electric motor for exerting a counter torque upon said shaft member, an operating circuit including an amplifier, means for generating electrical signals in said operating circuit in accordance with varying rotational speed of said shaft member, a supply circuit for said electric motor, said electrical signals in said operating circuit acting as an adjustment factor for regulating said supply circuit to control the counter torque exerted by said electric motor upon said shaft member, said operating circuit including a rectifier.

11. A device for influencing tape traction in conveying apparatus for tape type record carriers, preferably for magnetic tapes, comprising a shaft member adapted to be rotated by a tape which is being unwound, an electric motor for exerting a counter torque upon said shaft member, an operating circuit including an amplifier and a rectifier, means for generating electrical signals in said operating circuit in accordance with varying rotational speed of said shaft member, a supply circuit including an inductor for controlling said electric motor, said electrical signals in said operating circuit varying the impedance of said inductor and acting as an adjusting factor for regulating said supply circuit to control said counter torque exerted upon said shaft member.

12. A device for influencing tape traction according to claim 11; wherein said supply circuit further includes a rectifier.

References Cited by the Examiner

UNITED STATES PATENTS

| | | | |
|---|---|---|---|
| 2,383,360 | 8/1945 | Artzt | 318—328 X |
| 2,715,202 | 4/1955 | Turner et al. | 308—302 X |
| 2,767,367 | 10/1956 | Black | 318—302 X |
| 2,970,788 | 2/1961 | Warnacke | 318—48 |
| 3,005,940 | 10/1961 | Johnson | 318—328 X |
| 3,016,428 | 1/1962 | Kabell et al. | 318—302 X |
| 3,023,332 | 2/1962 | Cox. | |
| 3,097,332 | 7/1963 | Mullin | 318—314 |
| 3,179,870 | 4/1965 | Maxey | 318—302 |

ORIS L. RADER, *Primary Examiner.*

S. GORDON, G. SIMMONS, J. C. BERENZWEIG, *Assistant Examiners.*